(12) United States Patent
Masterson et al.

(10) Patent No.: US 11,661,733 B2
(45) Date of Patent: May 30, 2023

(54) SPRING-LOADED FLOAT TREE AND FLOAT TREE ASSEMBLY

(71) Applicant: ZOELLER PUMP COMPANY, LLC, Louisville, KY (US)

(72) Inventors: Daniel C. Masterson, Louisville, KY (US); Charles P. Carroll, Louisville, KY (US)

(73) Assignee: Zoeller Pump Company, LLC, Louisville, KY (US)

( * ) Notice: Subject to any disclaimer, the term of this patent is extended or adjusted under 35 U.S.C. 154(b) by 0 days.

(21) Appl. No.: 17/643,225

(22) Filed: Dec. 8, 2021

(65) Prior Publication Data

US 2022/0178132 A1 Jun. 9, 2022

Related U.S. Application Data

(60) Provisional application No. 63/123,035, filed on Dec. 9, 2020.

(51) Int. Cl.
*G01F 23/58* (2006.01)
*E03F 5/22* (2006.01)
*G01F 23/76* (2006.01)

(52) U.S. Cl.
CPC ............... *E03F 5/22* (2013.01); *G01F 23/58* (2013.01); *G01F 23/76* (2013.01)

(58) Field of Classification Search
CPC .... E03F 5/22; E03F 7/00; E03F 5/101; G01F 23/76; G01F 23/58; E03B 11/00; E03B 11/16

USPC ................ 73/122, 290 R, 305–322.5, 866.5; 248/542, 543

See application file for complete search history.

(56) References Cited

U.S. PATENT DOCUMENTS

| 4,244,602 | A * | 1/1981 | Allsop | A63C 11/221 |
| | | | | 280/821 |
| 2002/0137602 | A1* | 9/2002 | Herman | A63B 25/08 |
| | | | | 482/77 |
| 2004/0164516 | A1* | 8/2004 | Baginski | B60D 1/62 |
| | | | | 280/420 |
| 2008/0132343 | A1* | 6/2008 | Blumenthal | A63G 13/08 |
| | | | | 472/95 |
| 2010/0187870 | A1* | 7/2010 | Mackenroth | B62J 1/04 |
| | | | | 297/209 |
| 2012/0032035 | A1* | 2/2012 | Burrows | F16L 3/16 |
| | | | | 248/70 |
| 2020/0119481 | A1* | 4/2020 | Struyk | H01R 12/714 |

* cited by examiner

*Primary Examiner* — Robert R Raevis
(74) *Attorney, Agent, or Firm* — Scott R. Cox; Jessica C. Ronald; Jeffery Langer

(57) ABSTRACT

A float tree for suspending floats within a basin system includes a rod portion, a cap section, movably affixed to the rod portion, and a spring provided between the cap section and the rod section. The spring provides force against the rod portion and the cap section. A first and second cap can be included to seat the spring between the cap section and the rod portion within the float tree.

19 Claims, 8 Drawing Sheets

SPRING-LOADED FLOAT TREE AND FLOAT TREE ASSEMBLY

CROSS-REFERENCE TO RELATED APPLICATIONS

This application claims priority from U.S. provisional application Ser. No. 63/123,035 filed on Dec. 9, 2020.

BACKGROUND OF INVENTION

Float trees are common elements in wastewater basin systems. Float trees are used to suspend float switches or other sensors in basin systems. They may be formed of a rod or bar shaped plastic or metal. In application, the float tree extends perpendicular to a surface of wastewater in a basin to allow one or more floats that are attached to the float tree to dangle. When the wastewater surface rises and disturbs the float, this triggers pumping by a pump also included in the basin system.

Float trees may be snapped into place during assembly and before being installed for application. However, float trees, such as those positioned using snap-in connections, are subject to movement during transport of a basin system, including the float tree, to the application site. As such, during transportation snapped-in float trees may become bent or displaced or may break or damage molded points or other connections required to position the float tree.

Further, float trees can be used in various sized basin systems.

As such, a more robust and adjustable float tree that is unlikely to become dislodged during transportation is required. Such a float tree should also not create damage to positioning points in the basin system during transportation thereof.

BRIEF SUMMARY OF INVENTION

To address the issues with prior art float trees, there has been discovered a float tree having a rod portion (also referred to as a "rod"), a cap section, movably attached to the rod, and a spring provided between the cap section and the rod portion, wherein the spring exerts a force against the rod portion and the cap section.

DETAILED DESCRIPTION OF THE INVENTION

Figure 1:
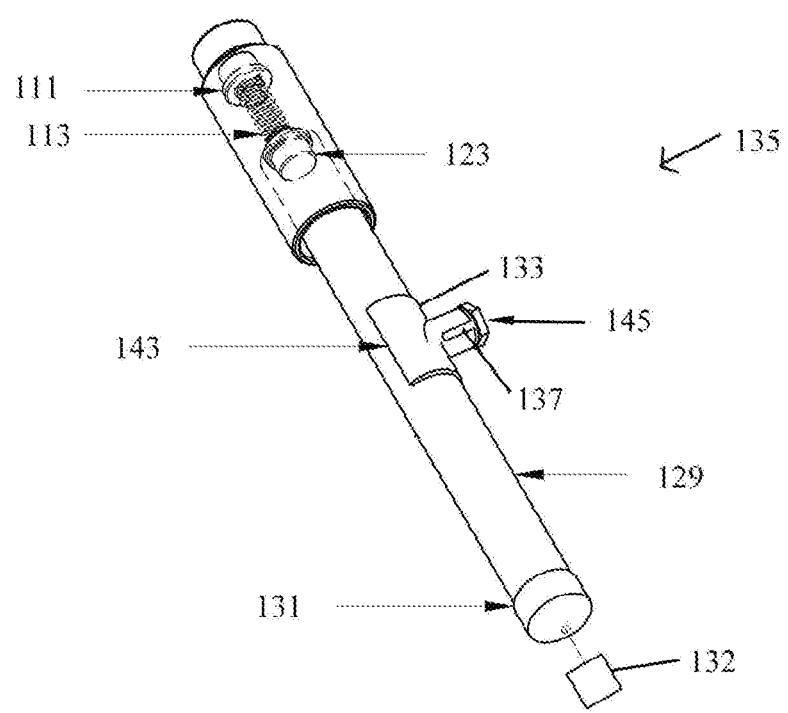
FIG. 1 is a perspective view of one embodiment of a spring-loaded float tree.
Figure 3:
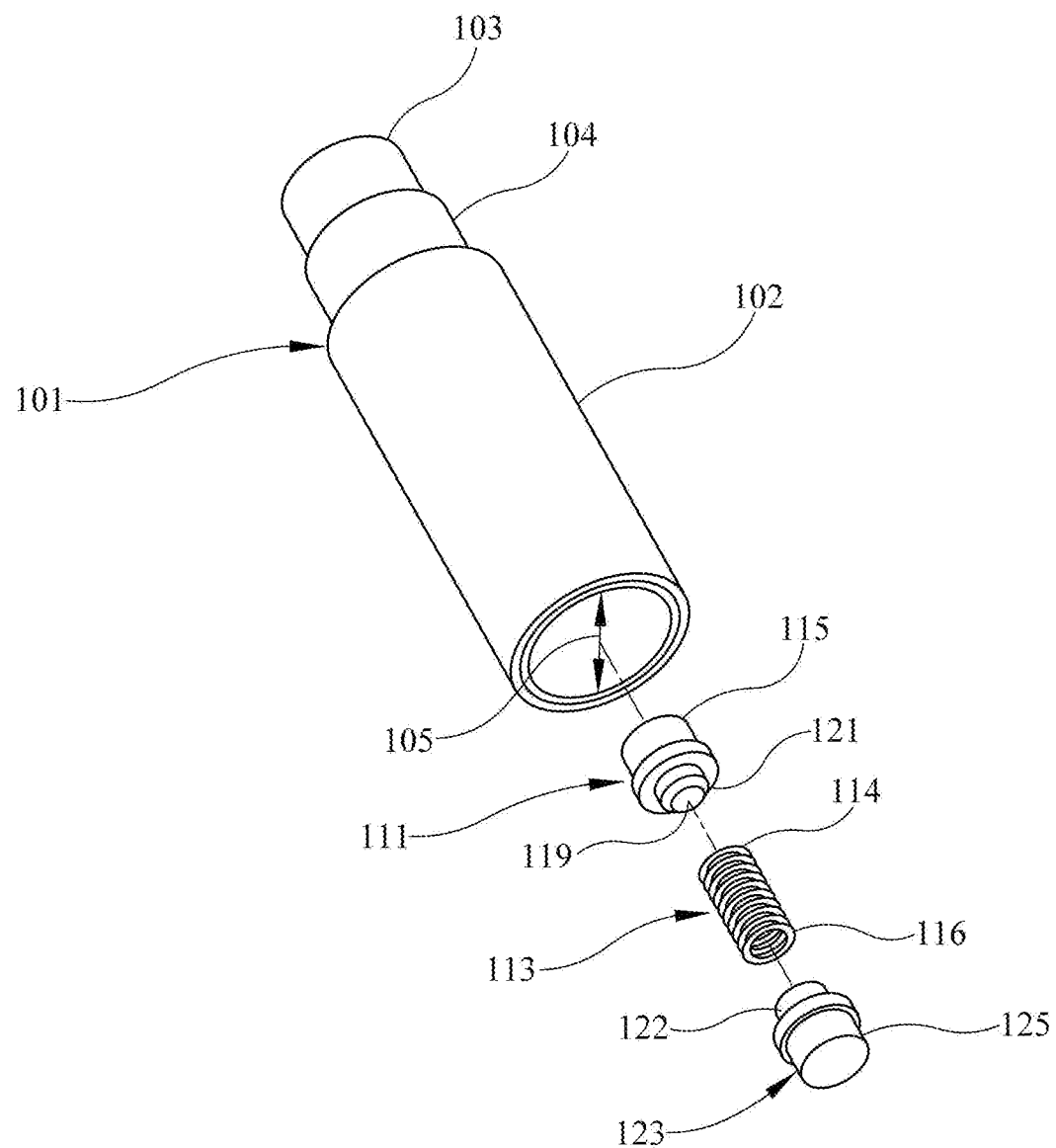
FIG. 3 is an exploded view of a portion of the spring-loaded float tree of FIG. 1.
Figure 4A:
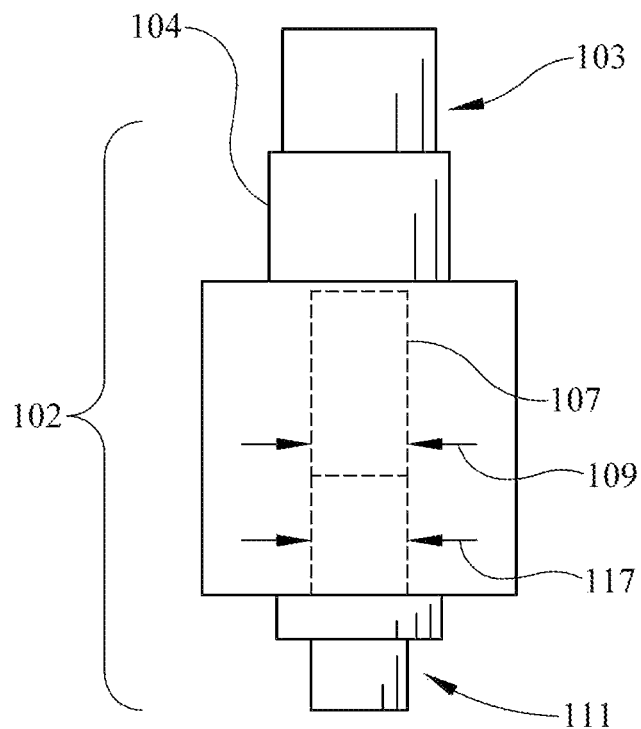
FIG. 4A is a side view of a cap section of the spring-loaded float tree of FIG. 1 showing internal components thereof.
Figure 4B:
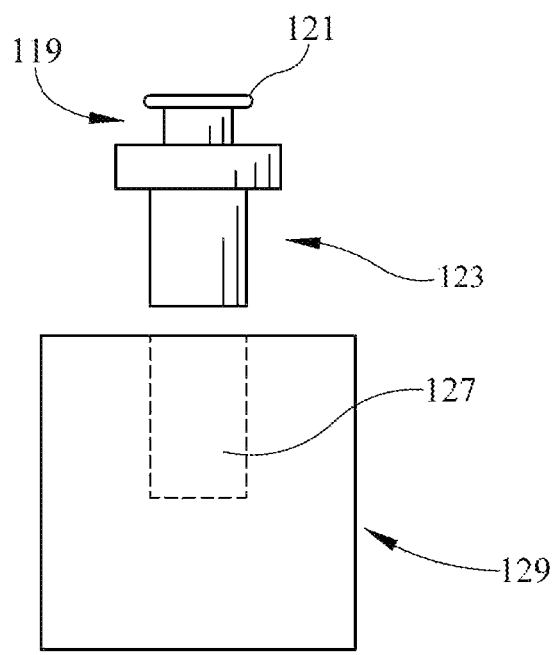
FIG. 4B is a side view of a rod portion of the spring-loaded float tree of FIG. 1 showing internal components thereof.
Figure 4C:
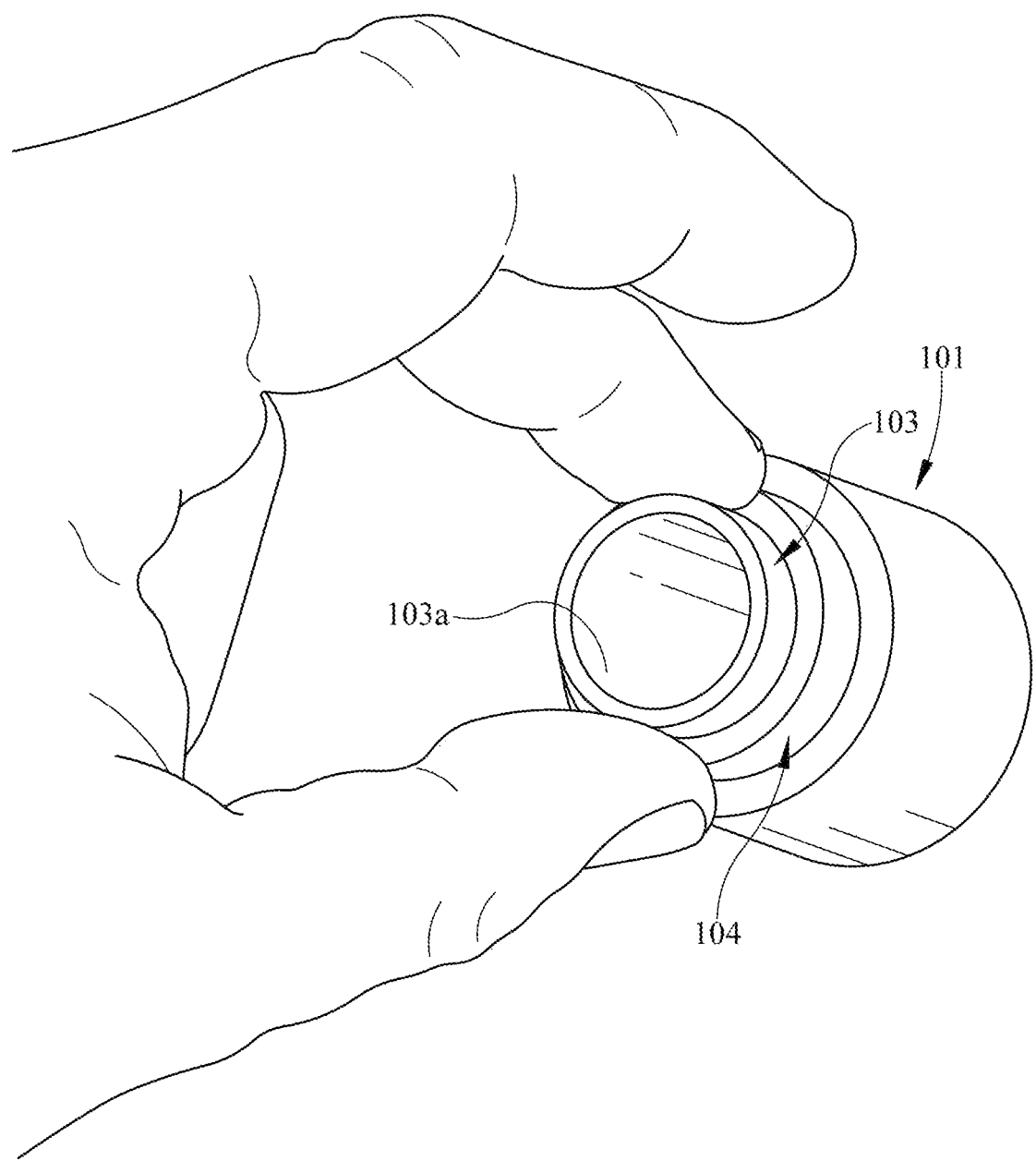
FIG. 4C is a cutaway view of an open upper portion of a molded portion of an end section of the cap section of FIG. 4A.

A spring-loaded float tree 135 capable of addressing the deficiencies in the prior art is described herein. The float tree 135, as disclosed in FIGS. 1, 2, and 3, includes cap section 101. The cap section 101 is formed of a main portion 102 and an end section 104. On one end of the end section 104, a molded portion 103 with a smaller diameter than the main portion is provided. The diameter of this molded portion 103 may be sized according to a receiver portion 157 formed in a lid 151 of the basin system to allow for secure installation. See FIGS. 4A, 4B, 4C, 5, 6 and 7. As shown in FIG. 4C an open upper portion 103a of the molded portion can be provided to secure the spring-loaded float tree in place within the receiver portion.

The main portion 102 of the cap section 101 is at least partially hollowed out to form a first diameter 105. See FIG. 3. Cap section 101 may further include a gap 107 (also the "first gap"). Gap 107 has a second inner diameter 109 measured across the inner walls of gap 107. See FIG. 4A.

A first cap 111 is used to secure spring 113 within cap section 101. See FIGS. 3 and 4A. First cap 111 is formed having diameter slightly less than a diameter 109 to allow for a tight fitting of cap 111 in gap 107 and so that the first cap is sized to seat in the first gap. For example, cap 111 may have a head portion 115 having a dimeter 117 measured on an outer wall of head portion 115 that is slightly less than diameter 109. The diameter of spring 113 may be chosen such that it is roughly the same or slightly larger than a butt portion 119 of cap 111. In addition, or in the alternative embodiment, butt portion 119 may further include a first lip 121 that has a slightly larger diameter than the remainder of portion 119 at an end opposite from the head portion. See FIG. 4B. A first end 114 of spring 113 can be secured over lip 121 and further secured in this manner. In one embodiment the spring radially grips the first cap.

In view of the preceding description, one of ordinary skill in the art will now appreciated that alternative embodiments are possible. As an example, cap section 101 and cap 111 may be integrally formed rather than using independent components requiring gap 107. For example, rather than machining each part individually, an integrated end cap 131 of the assembled float tree 135 including cap section 101 and cap 111 may be formed having the same features as described above.

A second cap 123 mirrors many or all features of first cap 111. See FIG. 4B. In one embodiment the first and the second cap are identical in structure. Second cap 123 may include a second lip 122 to allow a second end 116 of spring 113 to be secured over this second lip formed on cap 123. In one embodiment the spring radially grips the second cap. Second cap 123 may also include a portion 125 formed to have a diameter slightly less than a gap 127 (also the "second gap") formed in rod 129 so that it is sized to seat in the second gap. In one embodiment the gap of the rod may have a second diameter across the gap 127 that is slightly less than the diameter of the gap in the cap section 101. It will now be apparent to one of ordinary skill in the art that caps 111 and 123 may be permanently affixed, for example with glue, to secure the respective portions to be imbedded in cap section 101 and gap 127 in rod 129. Alternatively, first cap 111 and second cap 123 may have ends of a diameter slightly less than gaps 107 and 109 to permit sufficient securing of the caps while allowing for quick removal by a technician.

Cap section 101 has a diameter measured on the inner wall portion of cap section married to rod 129 after final assembly. The diameter of cap section 101 is generally only slightly larger than the outer wall diameter of rod 129 but sufficient to allow cap section 101 to slide along an axis defined by the center of cap section 101 and rod 129. When cap 101 slides along rod 129, compression on spring 113 increases as it pushes against the cap 101 and rod 129. This compression provides stable locking and flexibility in the float tree should the basin system be subjected to jostling or other disturbances during transport ensuring that it prevents the inadvertent damage or breakage of the basin.

Figure 2:
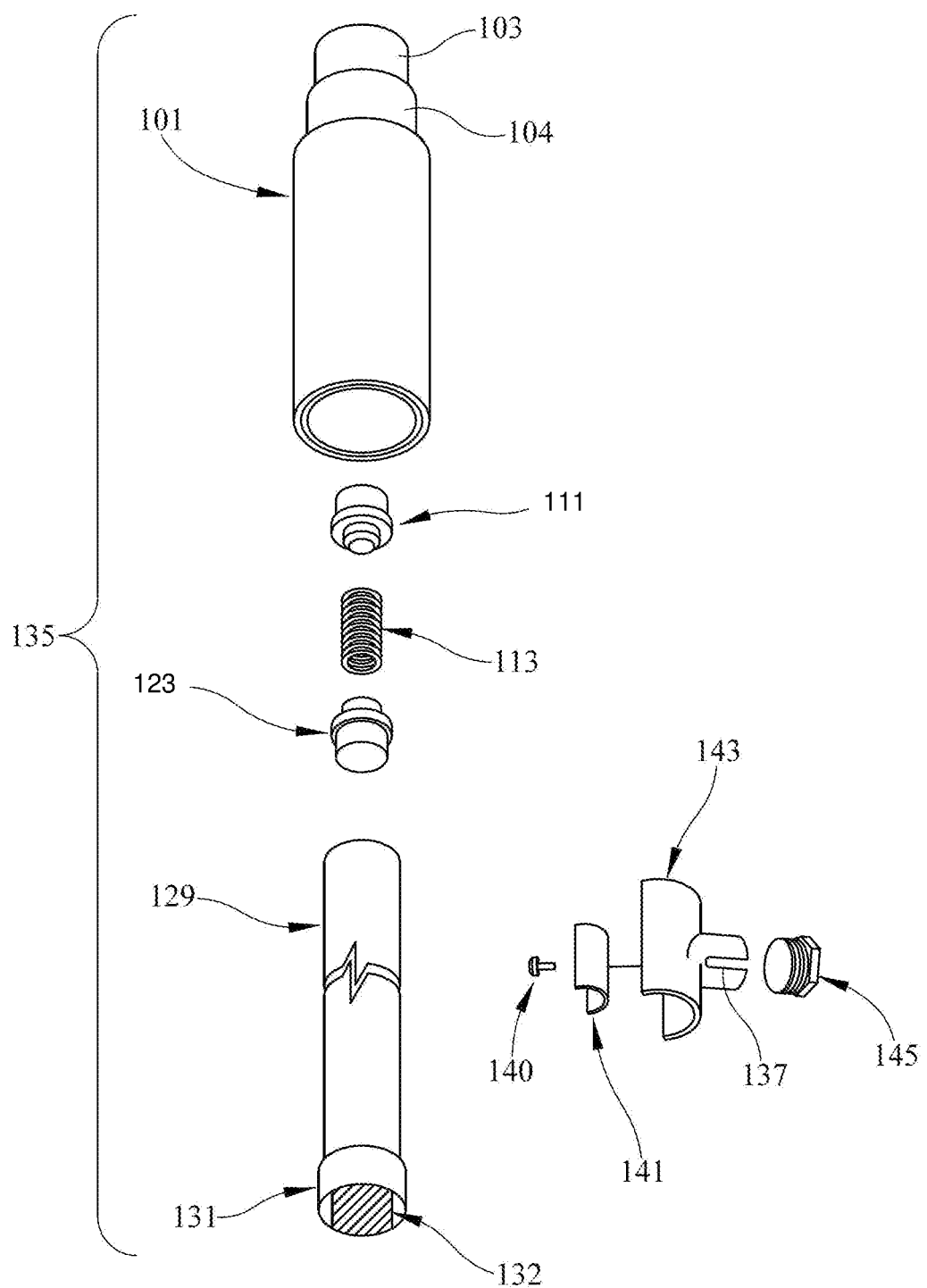
FIG. 2 is an exploded view of the spring-loaded float tree of FIG. 1.

As shown in the FIG. 2, rod 129 is provided with an end cap 131. End cap 131 may be substituted for a similar cap section 101 instead to provide additional locking capability by increasing the number of springs providing tension to the float tree Alternatively, or in addition, end cap 131 may be formed of a complimentary shape to a receiving portion 155 formed in the basin system for receiving cap 131 and providing a locking function to the float tree.

A saddle assembly 133 may be added to the float tree 135 to allow for hanging of floats on the float tree 135. In one embodiment the saddle assembly is secured to an outer wall of the rod portion 129. See FIGS. 1 and 2. In one embodiment the arc of the saddle assembly is sufficiently large to permit the saddle assembly to snap securely onto the rod portion of the float tree. Saddle assembly 133 may be further secured to the rod portion by using a pin 140 that is inserted in the saddle assembly 133. In an alternative embodiment, as shown in FIG. 2, a strip of resilient material, such as a rubber sheet 141, is placed between a surface of the outer wall of the float tree and the saddle assembly. Other methods of securing the saddle assembly to the rod portion of the float tree may also be used that would be familiar to a person skilled in the art.

Saddle assembly 133 may include a groove 137 which allows the float cord to pass therethrough.

An exterior portion 143 of the saddle assembly 133, defined as the portion of the saddle assembly protruding out and away from wall of the float tree, may also be provided. Exterior portion 143 may receive a locking cap 145 to secure the float cord during operation. In some instances, the interior wall of the exterior portion 143 receiving locking cap 145 may be threaded and cap 145 may have complimentary threads formed on its exterior to allow for screw down locking cap 145 to retain the float cord.

Figure 5:
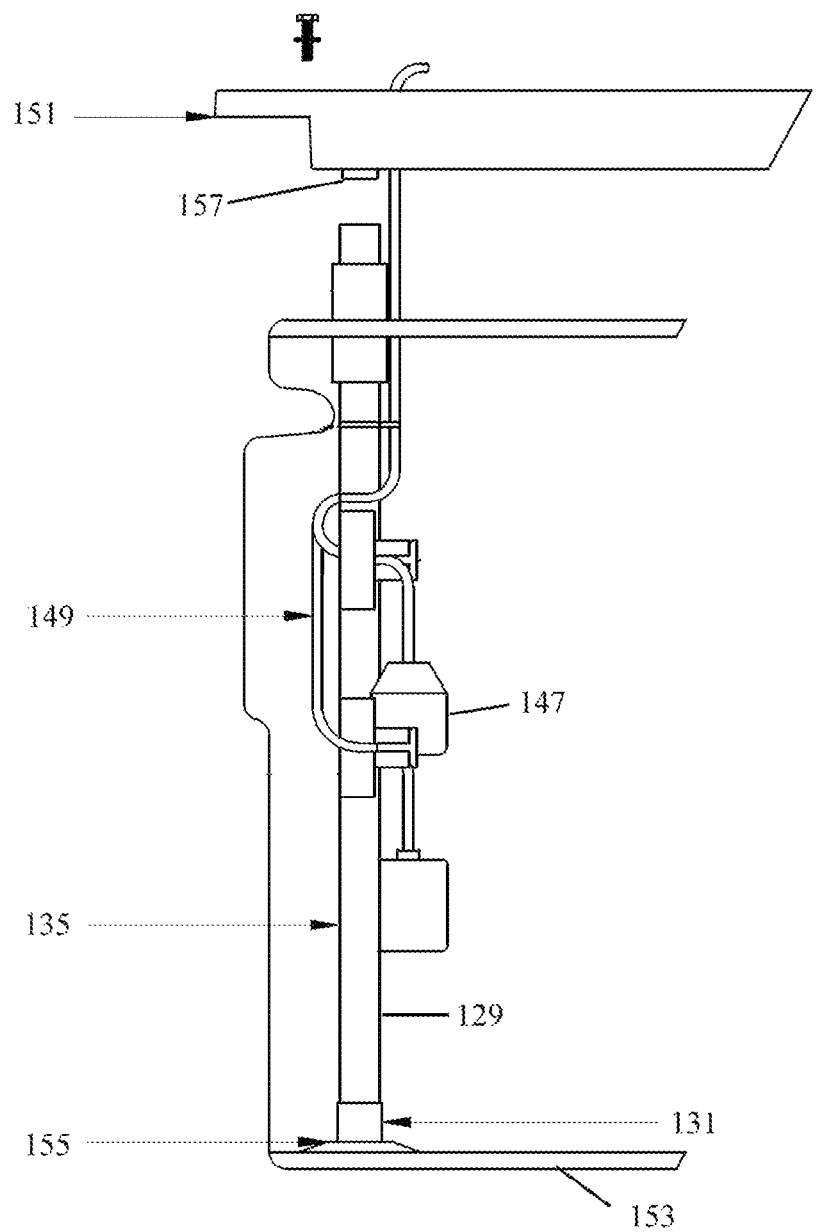
FIG. 5 is a side view of the spring-loaded float tree of FIG. 1 installed within a basin.
Figure 6:
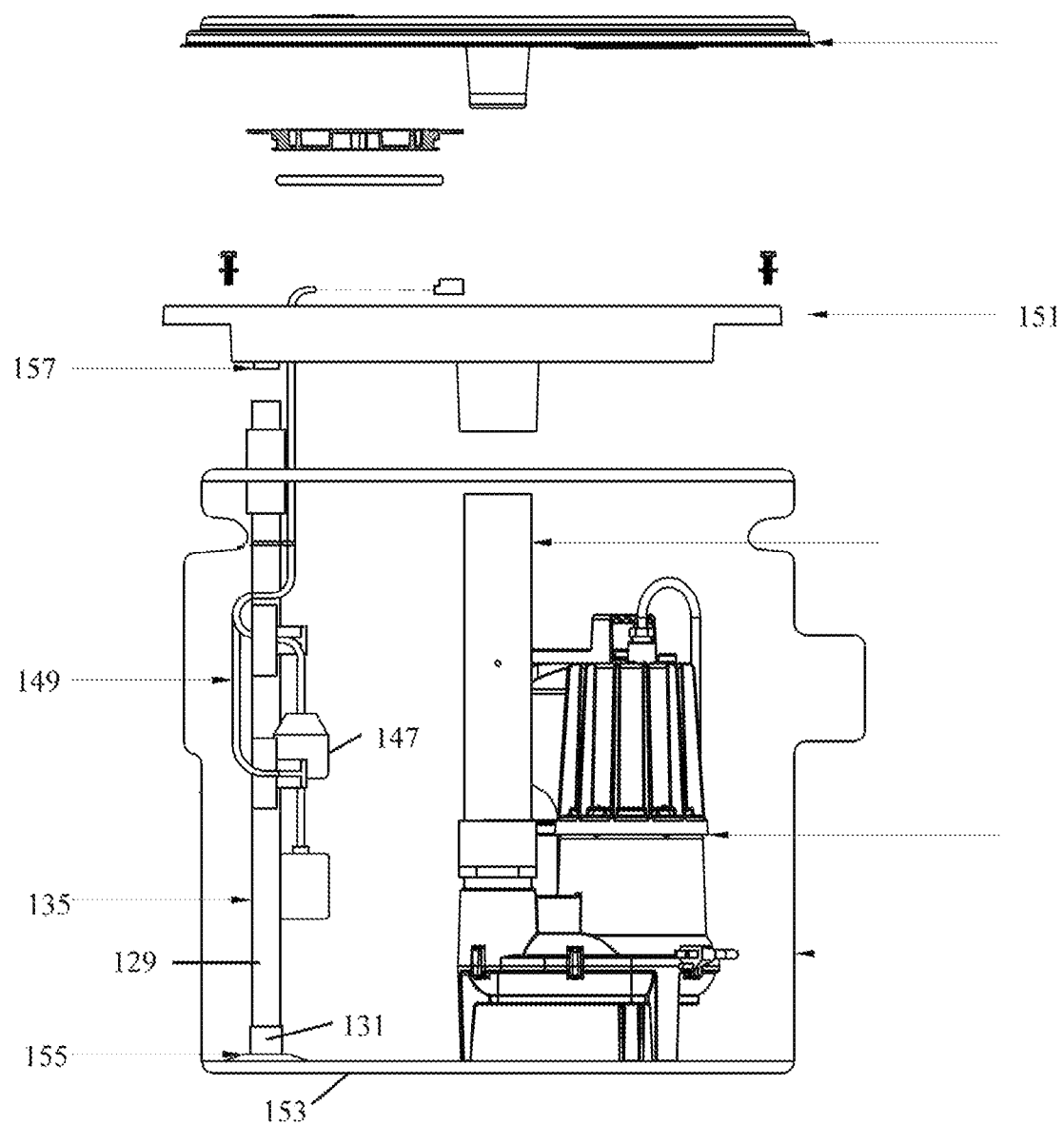
FIG. 6 is a side view of the spring-loaded float tree of FIG. 1 installed within a basin which includes a sump pump assembly.
Figure 7:
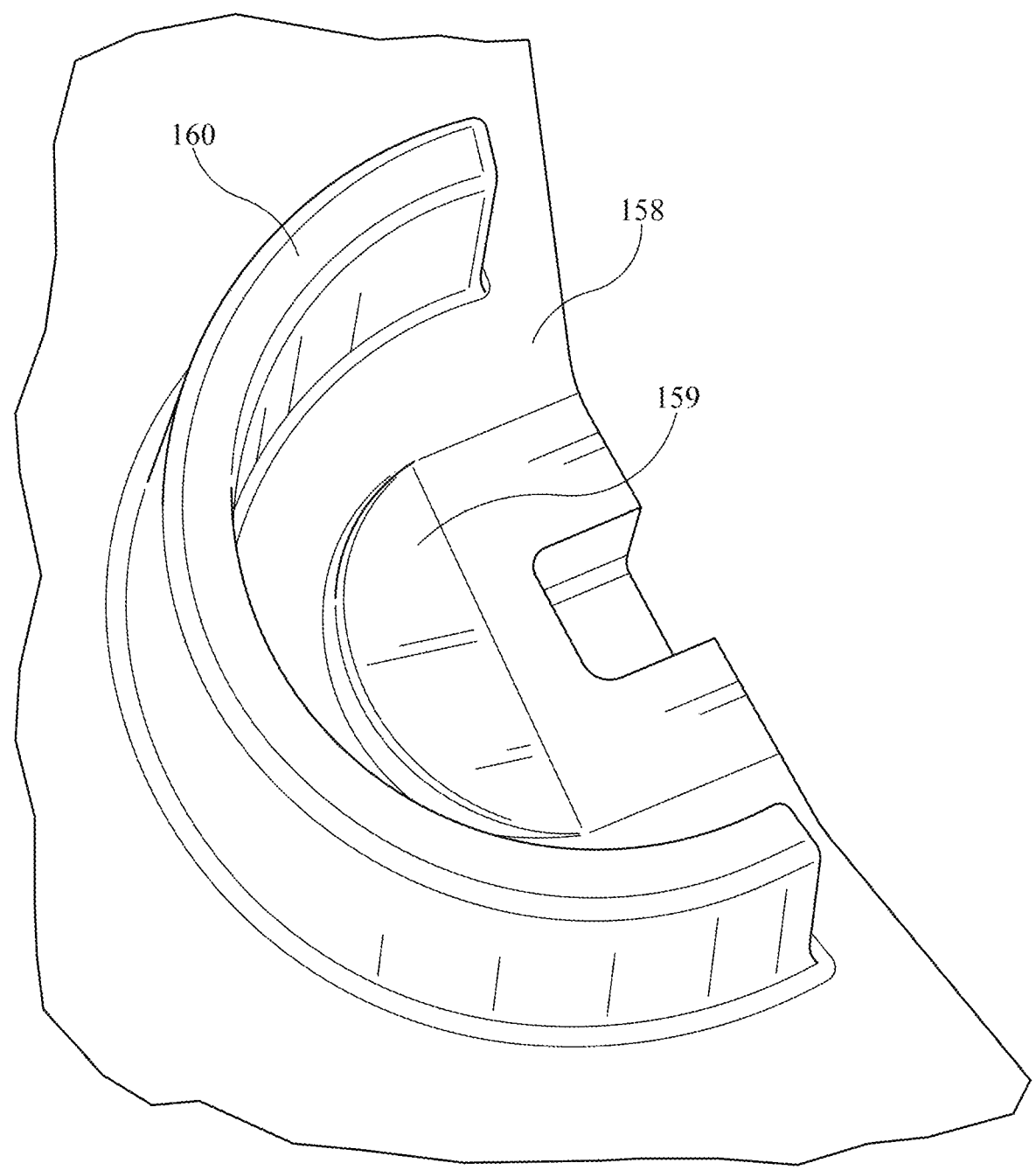
FIG. 7 is an upper perspective view of a receiver portion on a surface of a lid of the basin of FIG. 5 for receiving the spring-loaded float tree.

FIGS. 5 and 6 illustrate the float tree in a typical application. One or more floats 147 are hung on the float tree 135. A cord 149 electrically connected to one or more of floats 147 may be run through a hole in basin lid 151. It will now be clear to one of ordinary skill in the art that although multiple floats 147 are illustrated in the figures, a single float or other sensor may used. Basin base 153 receives the end portion 131 of rod 129. It will now be clear to one of ordinary skill in the art that although end cap 131 is described in the embodiment above, a receiving portion 155 may be formed in basin base 153 for receiving the rod 129 without the need for an end cap. Alternatively, the receiving portion 155 may be a separately formed piece that is affixed to the basin base 153 to receive the end portion of rod 129. In yet another alternative embodiment, receiving portion 155 may be formed to receive rod 129 including end cap 131.

A receiver portion 157 may also be formed in the basin lid 151, and alternatively or in addition, in the basin base, to receive cap portion 101 of the float tree 135. As discussed with respect to other embodiments described herein, the smaller diameter portion 103 of end section 104 may be selected based on the shape of receiver portion 157 and/or receiving portion. In one embodiment the end of the rod portion and/or the cap section includes a cylindrical, open ended portion 103a. See FIG. 4C.

In one embodiment the receiver portion 157 (and/or the receiving portion) includes an arc-shaped side 160 to support the cap section or the rod portion. See FIG. 7. A half-moon raised portion 159 is provided on a surface of the lid of the basin within the receiver portion to lock the cap portion 101 in position in the basin. The raised portion is designed with a ramped structure so that the molded portion 103 of the end section 104 faces an increasing amount of friction as the cap slides into place within the arc-shaped side 160 of the receiver portion and then finally clicks as the cap slides over the raised portion against the arc-shaped side.

In an alternative embodiment a sheet of material, such as a rubber sheet 132, is secured on an end of the cap portion, as shown in FIG. 2, which rubber sheet contacts the receiver portion and/or receiving portion of the basin to assist in securing the float tree within the basin by increasing the resistance of the float tree against rotation within the receiver portion and/or the receiving portion.

Other modification without deviating from the spirt of the above embodiments are possible. As an example, the rod may be formed of a variety of materials. Such materials should be structurally suitable based on mechanical requirements. Material selection may also be based on the specific application. For example, certain materials may perform better in wastewater, clean water, or saltwater environments. Certain materials may be preferable for extremely corrosive environments. The rod may be coated with a coating to protect its structural integrity based on the desired application environment. The rod may be solid. Alternatively, the rod may be a tube. The diameter of the rod may be sized according to basin size or increased when additional strength needed.

In general, the rod portion described herein may be any combination of parts that form an integrated rod and allow for lengthening or shortening the rod. The rod may comprise one or more interlocking pieces that allow for the rod portion to be adjusted in terms of length, the length of the rod being defined along an axis between the lid and the base of a basin system in application. As an example, the rod may comprise at least two portions that form a telescopic rod. The telescopic rod system may be locking. Alternatively, an additional cap portion may be used with an additional spring to affix the spring between the additional cap portion and the rod such that both ends of the rod are affixed with compressible cap portions.

The end cap may be molded into the basin. Alternatively, the mold of the basin bottom itself may be formed in the shape of an end cap to receive an uncapped end of the rod.

The float tree may be used in any number of applications. It may be used in clean water sump applications. It may be used in grinder pump applications. It may be used in sewage pump applications. It may be used with floats but is not so limited. It may be used to secure other alarm systems. It may be used to secure on/off sensors. It may be used to secure a high-water alarm sensor. It may be used to secure a low-water alarm sensor.

As used in this application, "slightly less" than or "smaller" than are used to describe a sizing relationship between different elements described above. As used herein, such terms may mean that the smaller item is 1-5% smaller than the larger item described in relation to the smaller item. Alternatively, "slightly less" or "smaller" may be mean a difference of 1% between the larger and smaller item with the smaller item be less than the larger item. Alternatively, "slightly less" or "smaller" may be mean a difference of 1-3% between the larger and smaller item with the smaller item be less than the larger item. Alternatively, any reasonable engineering requirements to ensure of functioning system is captured in the definition of slightly less or smaller when describing the relationship between the larger and smaller items with the smaller item be less than the larger item. Other modifications of the above technical concepts will now be obvious to those of ordinary skill in the art. For example, given that wastewater basin systems handle sewage gases that may be corrosive to metal springs, coating of the spring with a corrosive resistant material may further improve the overall performance of the float tree. In addition, or in the alternative, the spring may be formed of a variety of materials. For example, the spring may be formed of a polymer. The spring may be formed of metal. The spring may be formed of a corrosion resistant metal.

Other modifications will now be apparent to those of ordinary skill in the art without deviating from the spirit of the inventions described herein.

What is claimed:

1. A float tree used in wastewater or clean water systems; wherein the float tree comprises:
   a rod portion;
   a cap section, movably affixed to the rod portion;
   a spring provided between the cap section and the rod portion; and
   a saddle assembly, wherein the saddle assembly comprises an exterior portion affixed to an outer wall of the rod portion;
   wherein the spring provides force against the rod portion and the cap section.

2. The float tree according to claim 1, further comprising a first cap and a second cap, wherein the rod portion and the cap section have a first gap formed in the rod portion and a second gap formed in the cap portion, and further wherein the first cap and second cap are sized to seat in the first gap and the second gap respectively, and wherein the spring is affixed to the first cap and the second cap.

3. The float tree according to claim 2 where the spring is permanently affixed to the first cap and the second cap.

4. The float tree according to claim 1, wherein the saddle assembly further comprises a groove in the exterior portion sized to receive a float cord.

5. The float tree according to claim 4, wherein the saddle assembly further comprises a screw down locking cap screwed into the exterior portion of the saddle assembly to secure the float cord within the groove.

6. The float tree according to claim 1, wherein the saddle assembly further includes a pin, wherein the pin is inserted into the saddle assembly to secure the saddle assembly to the rod portion.

7. The float assembly according to claim 1, wherein the saddle assembly further includes a strip placed between a surface of an outer wall of the float tree and the saddle assembly.

8. The float tree according to claim 1 wherein the saddle assembly is permanently affixed on the rod portion.

9. The float tree according to claim 1, further comprising an end cap affixed on an end of the rod portion opposite to the spring.

10. The float tree according to claim 1, wherein the spring further comprises a corrosion resistant coating on the spring.

11. The float tree according to claim 1, wherein the cap section includes a hollowed out portion having a first diameter measured across an inner surface of a wall created by the hollowed out portion, wherein the rod portion has a second diameter, and wherein the first diameter is greater than the second diameter.

12. The float tree according to claim 1, wherein the rod portion and/or the cap section include a cylindrical, open ended portion.

13. A float tree used in wastewater or clean water application;
    wherein the float tree comprises:
    a rod portion, wherein the rod portion comprises a first end and a second end, and a first gap in the first end of the rod portion for receiving a first cap;
    a cap section, having a gap for receiving a second cap; and
    a spring, provided between the cap section and the rod portion, wherein the diameter of the spring is approximately the same as the diameter as the first cap and the second cap and wherein the spring radially grips the first cap and second cap to affix the spring to the first and second cap;
    wherein the spring provides force against the rod portion and the cap section.

14. The float tree according to claim 13, further comprising a saddle assembly, wherein the saddle assembly comprises an exterior portion affixed to an outer wall of the rod portion.

15. The float assembly according to claim 14, wherein the saddle assembly further includes a strip placed between a surface of an outer wall of the float tree and the saddle assembly.

16. The float tree according to claim 14, wherein the saddle assembly further comprises a groove sized to receive a float cord.

17. The float tree according to claim 16, wherein the saddle assembly further comprises a screw down locking cap screwed into the exterior portion of the saddle assembly to secure the float cord within the groove.

18. The float tree according to claim 13, wherein the cap section includes a hollowed out portion having a first diameter measured across an inner surface of a wall created by the hollowed out portion, wherein the rod portion has a second diameter, and wherein the first diameter is greater than the second diameter.

19. The float tree according to claim 13, wherein the spring further comprises a corrosion resistant coating on the spring.

* * * * *